US012769235B2

(12) United States Patent
Sato et al.

(10) Patent No.: US 12,769,235 B2
(45) Date of Patent: Oct. 20, 2026

(54) HEATER WITH A PROTECTIVE LAYER CONTINUOUSLY COVERING A HEAT GENERATING MEMBER AND HAVING A PLURALIPFY OF RECESSES PROVIDED AT INTERVALS ON A SUBSTRATE. HEATING DEVICE AND IMAGE FORMING APPARATUS

(71) Applicant: CANON KABUSHIKI KAISHA, Tokyo (JP)

(72) Inventors: Yutaka Sato, Tokyo (JP); Kenichi Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/426,134

(22) Filed: Jan. 29, 2024

(65) Prior Publication Data

US 2024/0280930 A1 Aug. 22, 2024

(30) Foreign Application Priority Data

Feb. 21, 2023 (JP) ................................ 2023-025431

(51) Int. Cl.
*G03G 15/20* (2006.01)

(52) U.S. Cl.
CPC ..... *G03G 15/2053* (2013.01); *G03G 15/2039* (2013.01); *G03G 15/2064* (2013.01)

(58) Field of Classification Search
CPC ...................... G03G 15/2053; G03G 15/2039
See application file for complete search history.

(56) References Cited

U.S. PATENT DOCUMENTS

| | | | | |
|---|---|---|---|---|
| 5,000,586 A * | 3/1991 | Daxer | F16C 33/24 384/282 |
| 5,376,773 A * | 12/1994 | Masuda | H05B 3/26 219/486 |
| 6,456,819 B1 * | 9/2002 | Abe | G03G 15/2064 399/329 |
| 10,545,437 B2 * | 1/2020 | Jinkoma | G03G 15/2053 |
| 10,761,461 B2 * | 9/2020 | Morimoto | G03G 15/2064 |
| 11,116,046 B2 * | 9/2021 | Kuchimachi | H05B 3/265 |
| 2010/0135706 A1 | 6/2010 | Miki et al. | G03G 15/20 |
| 2011/0236084 A1 | 9/2011 | Nishida et al. | G03G 15/20 |
| 2012/0020709 A1 | 1/2012 | Uchiyama et al. | G03G 15/20 |
| 2012/0155938 A1 | 6/2012 | Tanaka et al. | G03G 15/20 |
| 2013/0028622 A1 | 1/2013 | Nihonyanagi et al. | G03G 15/20 |
| 2016/0139546 A1 | 5/2016 | Imaizumi et al. | G03G 15/20 |
| 2016/0139551 A1 | 5/2016 | Narahara et al. | G03G 15/00 |
| 2016/0223966 A1 * | 8/2016 | Okajima | G03G 15/2053 |

(Continued)

FOREIGN PATENT DOCUMENTS

| | | | |
|---|---|---|---|
| JP | 2003-076178 | 3/2003 | |
| JP | 2006-179303 | 7/2006 | |
| JP | 2024141279 A * | 10/2024 | G03G 15/2025 |

*Primary Examiner* — Arlene Heredia Ocasio
(74) *Attorney, Agent, or Firm* — Venable LLP

(57) ABSTRACT

A heater includes a substrate, a heat generating member provided on the substrate; and a protective layer. The protective layer continuously covers a region in the substrate where the heat generating member is provided and on a surface of which at least one recess is formed. A first region where the heat generating member is provided and a second region where the recess is formed are not overlapped with each other as the protective layer is viewed in the thickness direction.

7 Claims, 11 Drawing Sheets

(56) References Cited

U.S. PATENT DOCUMENTS

| | | | | |
|---|---|---|---|---|
| 2017/0343929 | A1 | 11/2017 | Narahara et al. | G03G 15/20 |
| 2018/0373189 | A1 | 12/2018 | Wakatsu et al. | G03G 15/20 |
| 2020/0233346 | A1 | 7/2020 | Sato et al. | G03G 15/20 |
| 2020/0233352 | A1 | 7/2020 | Doda et al. | G03G 15/20 |
| 2020/0285179 | A1* | 9/2020 | Seki | G03G 15/2053 |
| 2020/0301330 | A1 | 9/2020 | Yoshida et al. | G03G 15/20 |
| 2022/0107594 | A1* | 4/2022 | Chun | G03G 15/206 |
| 2022/0269198 | A1 | 8/2022 | Narahara et al. | G03G 15/00 |
| 2022/0291610 | A1* | 9/2022 | Seki | G03G 21/1685 |
| 2024/0134304 | A1 | 4/2024 | Nakazono et al. | G03G 15/20 |
| 2024/0329577 | A1* | 10/2024 | Nasu | G03G 15/2064 |

* cited by examiner

HEATER WITH A PROTECTIVE LAYER CONTINUOUSLY COVERING A HEAT GENERATING MEMBER AND HAVING A PLURALIPFY OF RECESSES PROVIDED AT INTERVALS ON A SUBSTRATE. HEATING DEVICE AND IMAGE FORMING APPARATUS

FIELD OF THE INVENTION AND RELATED ART

The present invention relates to a heater, a heating device and an image forming apparatus.

Image forming devices of electrophotographic printers, copiers, etc. are provided with a heating device which fixes toner to a recording material at a fixing nip portion which is formed by a fixing film and a pressing roller. A heater is arranged inside the fixing film. The heater includes a heat generating resistor which is provided on a substrate and a protective layer such as glass which protects the heat generating resistor. The heat which is generated from the heater is transferred to the fixing film, and the toner is fixed to the recording material which is nipped at the fixing nip portion. In such image forming apparatus, a technique which improves a sliding property of a fixing film and a heater by providing a groove on a surface of the heater's protective layer (sliding surface with the fixing film) is disclosed in Japanese Laid-Open Patent Application (JP-A) 2003-76178.

However, in a configuration in which the groove is provided in the protective layer, depending on an arrangement of the heat generating resistor and the groove, the heat from the heat generating resistor may be insulated by air in the groove and efficiency of heat transfer to the fixing film may be decreased.

SUMMARY OF THE INVENTION

In response to the above issue, it is an object of the present invention is to provide a heater, a heating device and an image forming apparatus which are capable of suppressing a decrease in efficiency of heat transfer.

According to an aspect of the present invention, there is provided a heater comprising: a substrate; a heat generating member provided on the substrate; and a protective layer configured to continuously cover a region in the substrate where the heat generating member is provided wherein when a direction of a longer side in a face of the substrate on which the heat generating member is provided is defined as a longitudinal direction, a direction perpendicular to the longitudinal direction in the face is defined as a short direction, and a direction perpendicular to the longitudinal direction and the short direction is defined as a thickness direction, the protective layer includes a recess toward the substrate in the thickness direction, and a first region where the heat generating member is provided and a second region where the recess is formed are not overlapped with each other as the protective layer is viewed in the thickness direction.

According to another aspect of the present invention, there is provided a heater comprising: a substrate; a heat generating member provided on the substrate; and a protective layer configured to continuously cover a region in the substrate where the heat generating member is provided, wherein when a direction of a longer side in a face of the substrate on which the heat generating member is provided is defined as a longitudinal direction, a direction perpendicular to the longitudinal direction in the face is defined as a short direction, and a direction perpendicular to the longitudinal direction and the short direction is defined as a thickness direction, the protective layer includes a recess toward the substrate in the thickness direction, a ratio of an area occupied by the recess to an area of a first region where the heat generating member is provided is smaller than a ratio of the area occupied by the recess to an area of a second region where the recess is provided is viewed in the thickness direction.

According to another aspect of the present invention, there is provided a heating device comprising: a rotatable cylindrical film; a substrate provided in an inner peripheral surface side of the film; a heat generating member provided on the substrate; an interposed member which is interposed between the heat generating member and an inner peripheral surface of the film, and slidable to the inner peripheral surface of the film while the film is rotated; and a pressing member configured to form a nip portion between itself and the protective layer via the film, wherein the heating device heats an unfixed toner image on a recording material nipped and conveyed in the nip portion by heat generated by the heat generating member and fixes on the recording material, and wherein when a direction of a longer side in a face of the substrate on which the heat generating member is provided is defined as a longitudinal direction, a direction perpendicular to the longitudinal direction in the face is defined as a short direction, and a direction perpendicular to the longitudinal direction and the short direction is defined as a thickness direction, a sliding surface with the film in the interposed member includes a recess toward the substrate in the thickness direction, a first region where the heat generating member is provided and a second region where the recess is formed are not overlapped with each other as the protective layer is viewed in the thickness direction.

According to another aspect of the present invention, there is provided a heating device comprising: a rotatable cylindrical film; a substrate provided in an inner peripheral surface side of the film; a heat generating member provided on the substrate; an interposed member which is interposed between the heat generating member and an inner peripheral surface of the film, and slidable to the inner peripheral surface of the film while the film is rotated, and a pressing member configured to form a nip portion between itself and the protective layer via the film, wherein the heating device heats an unfixed toner image on a recording material nipped and conveyed in the nip portion by heat generated by the heat generating member and fixes on the recording material, and wherein when a direction of a longer side in a face of the substrate on which the heat generating member is provided is defined as a longitudinal direction, a direction perpendicular to the longitudinal direction in the face is defined as a short direction, and a direction perpendicular to the longitudinal direction and the short direction is defined as a thickness direction, a sliding surface with the film in the interposed member includes a recess toward the substrate in the thickness direction a ratio of an area occupied by the recess to an area of a first region where the heat generating member is provided is smaller than a ratio of the area occupied by the recess to an area of a second region where the heat generating member is not provided as the protective layer is viewed in the thickness direction.

According to the present invention, it is possible to provide a heater, a heating device and an image forming apparatus which are capable of suppressing a decrease in efficiency of heat transfer.

Further features of the present invention will become apparent from the following description of exemplary embodiments with reference to the attached drawings.

Figure 5:
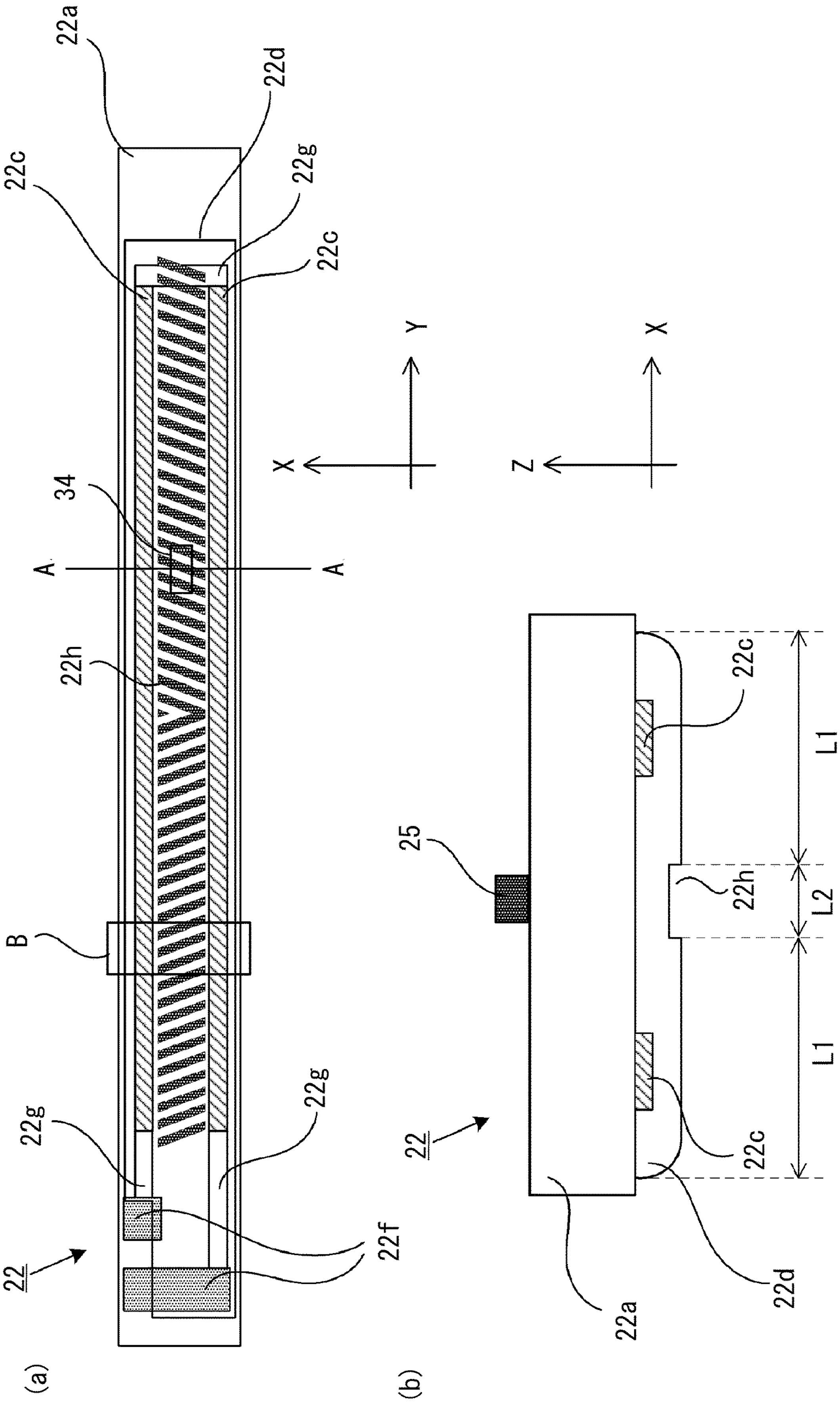

Part (a) of FIG. 5 is a plan view of a heater according to the first embodiment of the present invention, and part (b) of FIG. 5 is a sectional view of the heater according to the first embodiment of the present invention.

Figure 6A:
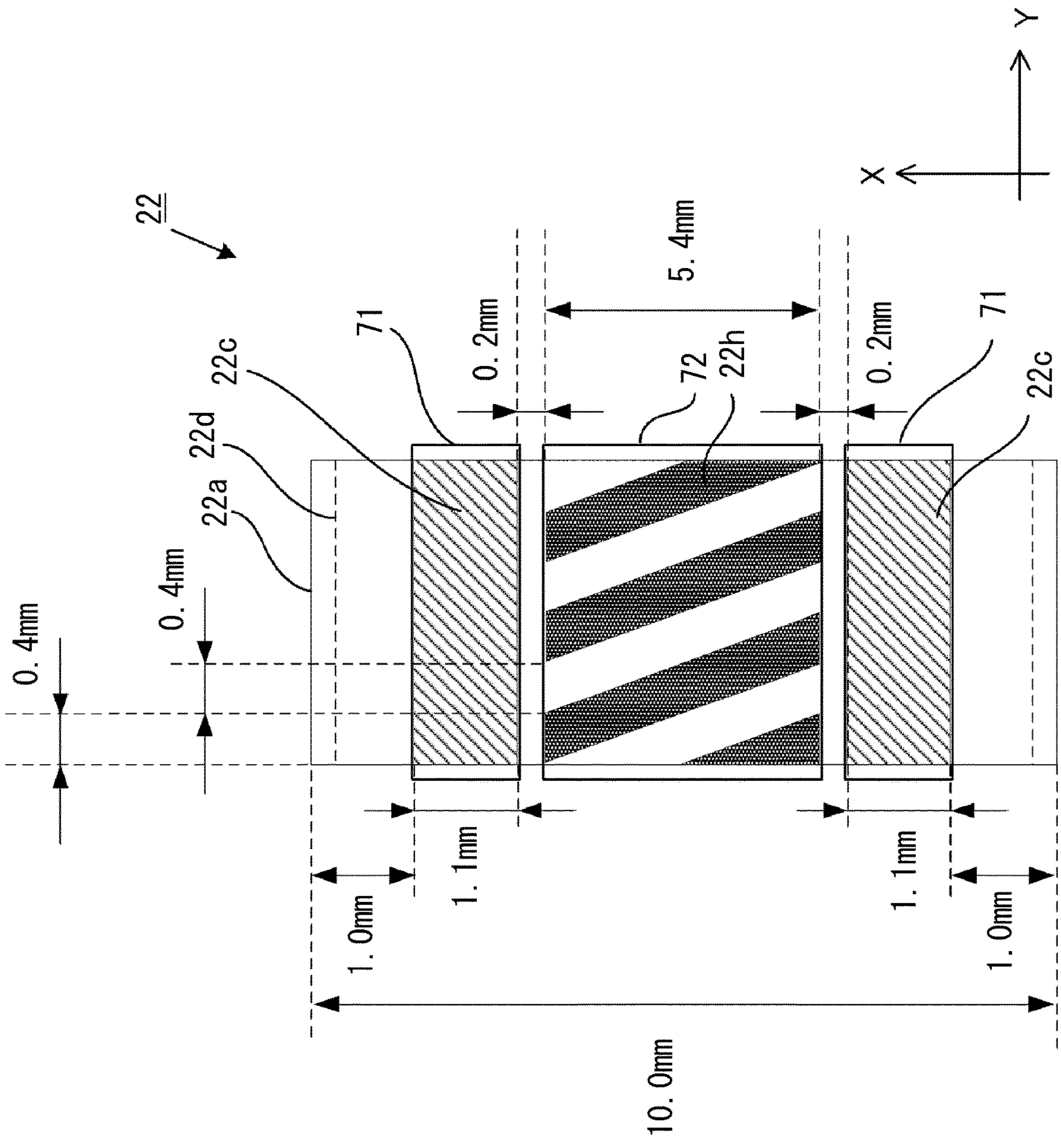

FIG. 6A is an enlarged view of a plan view of a heater according to the first embodiment of the present invention.

Figure 6B:
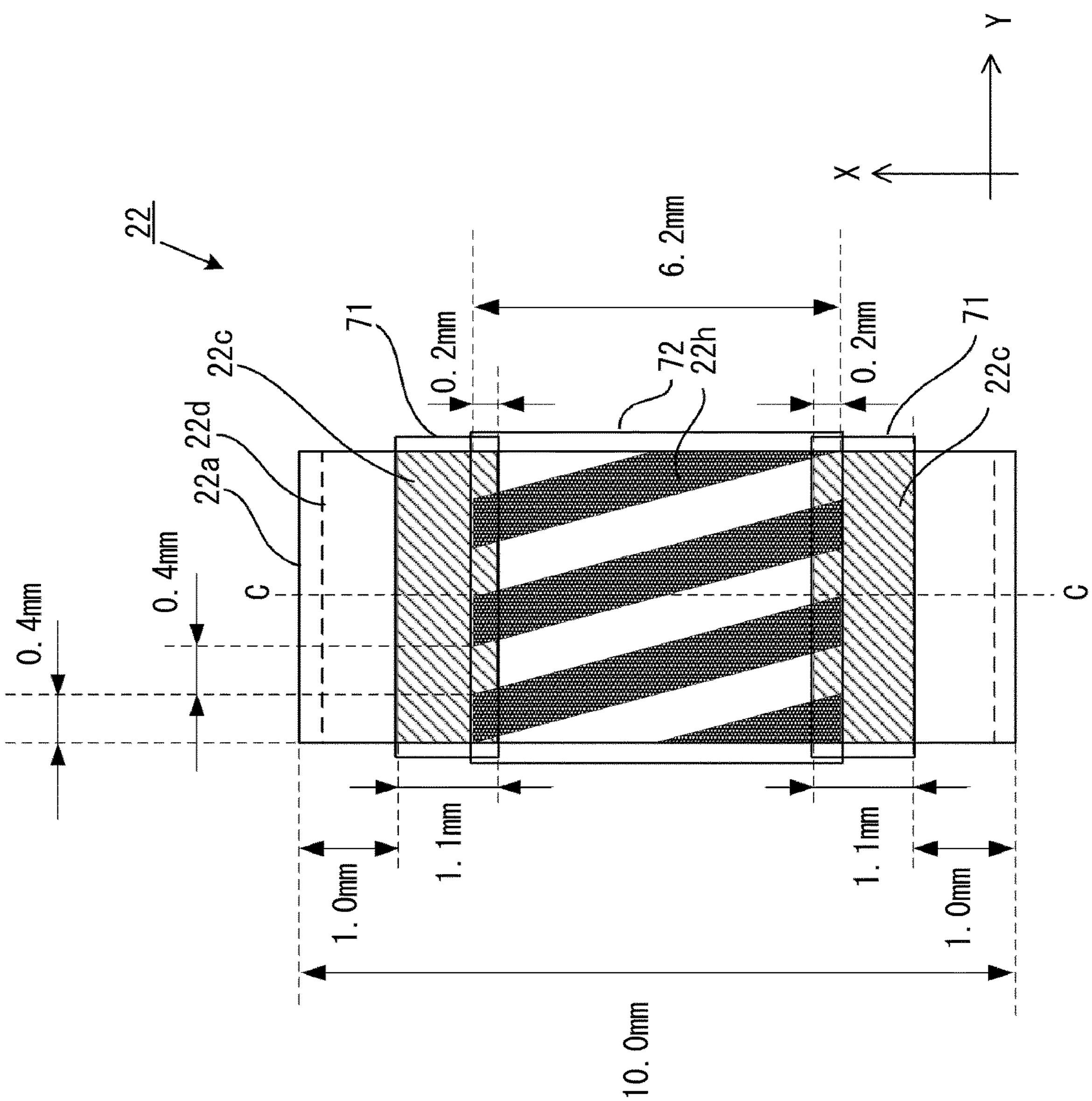

FIG. 6B is an enlarged view of a plan view of the heater according to the first embodiment of the present invention.

Figure 6C:
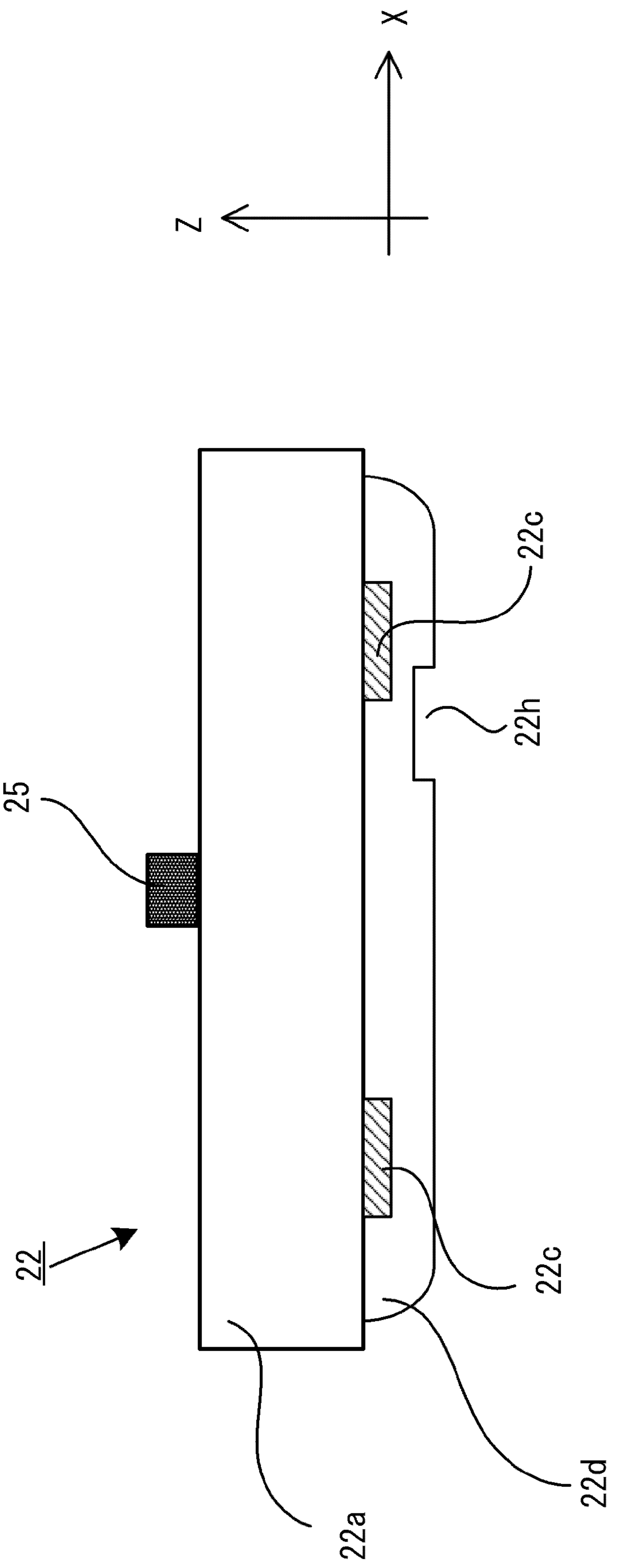

FIG. 6C is an enlarged view of a plan view of the heater according to the first embodiment of the present invention.

Figure 7:
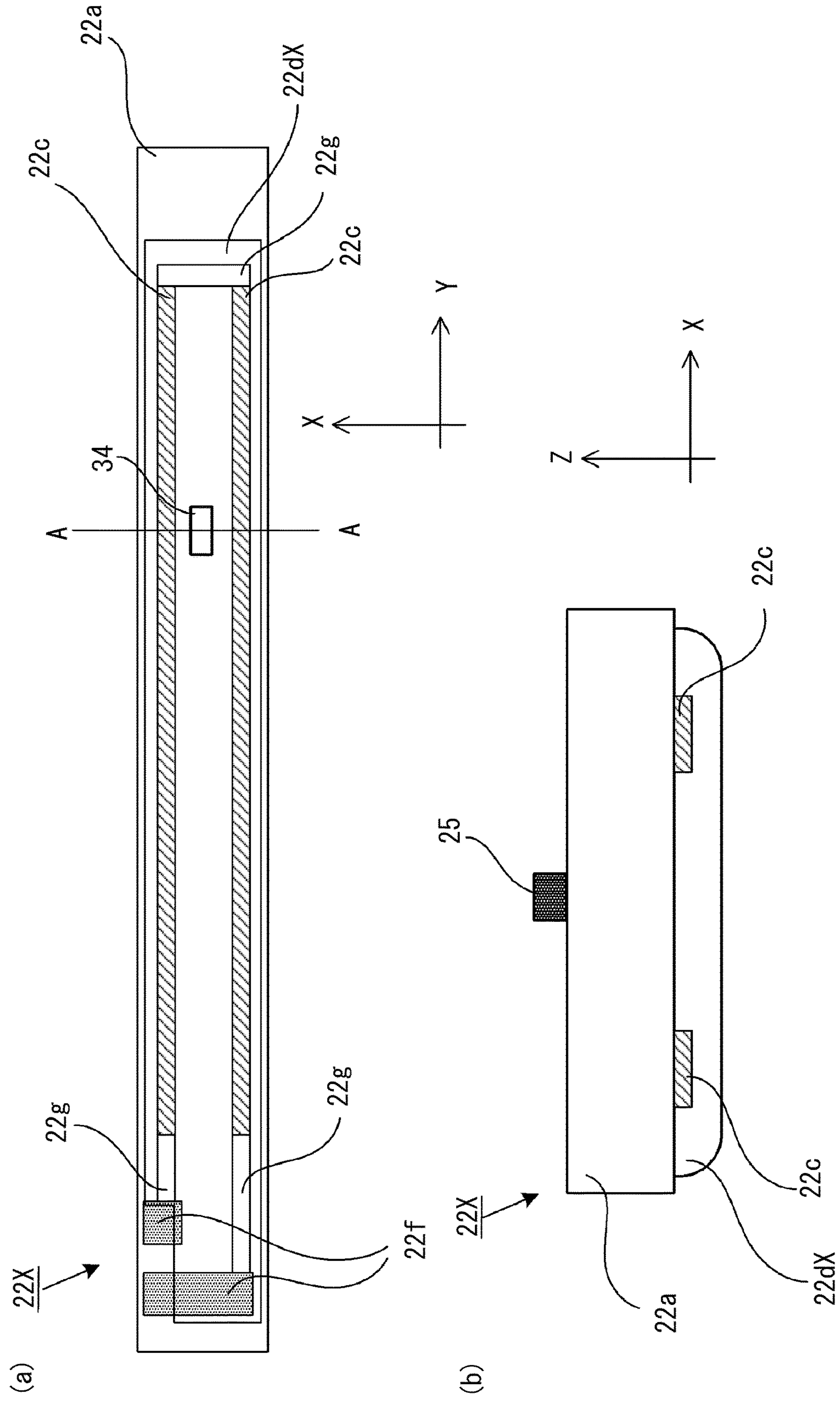

Part (a) of FIG. 7 is a plan view of a heater according to a comparative example 1 of the present invention, and part (b) of FIG. 7 is a sectional view of the heater according to the comparative example 1 of the present invention.

Figure 8:
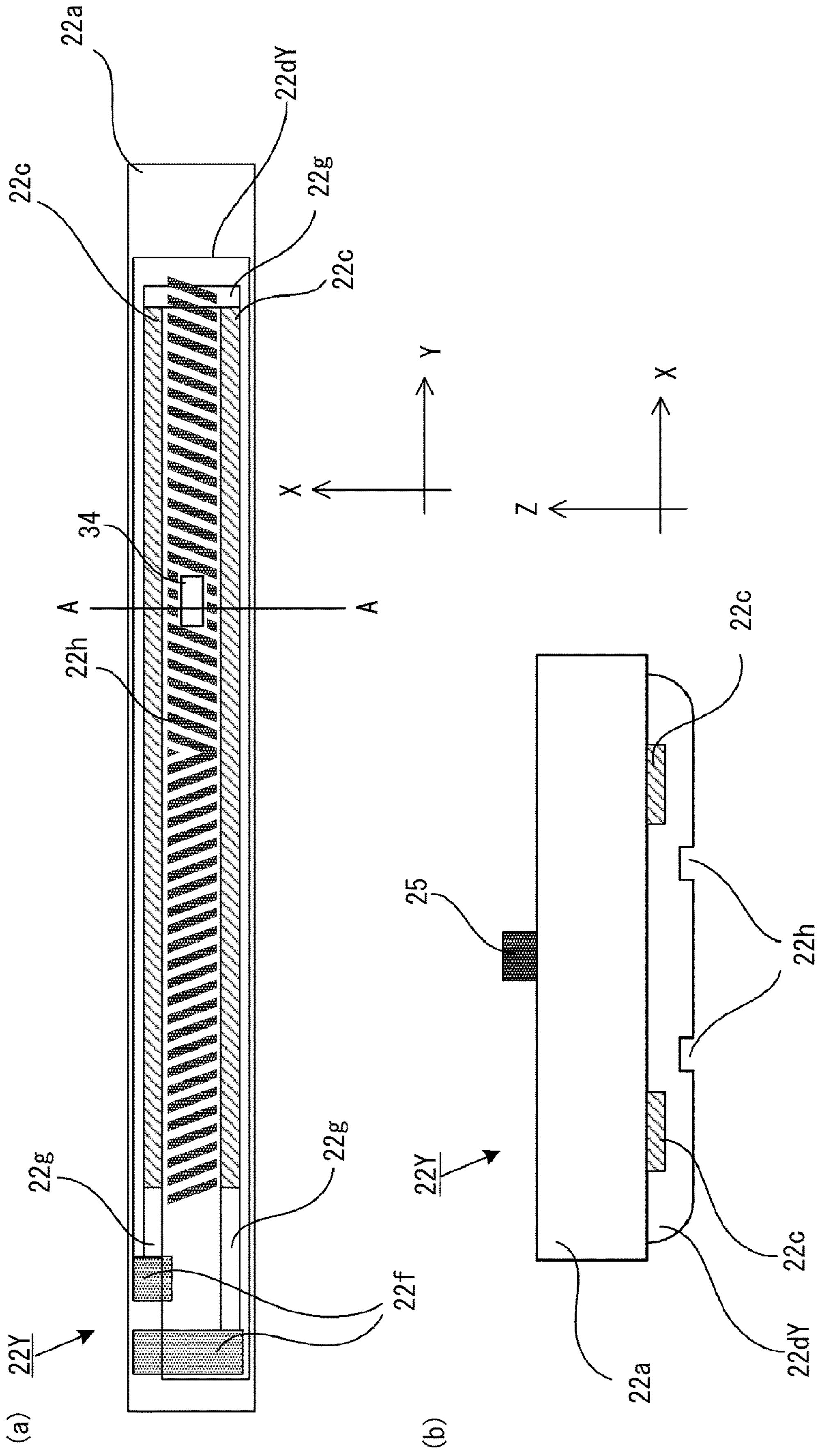

Part (a) of FIG. 8 is a plan view of a heater according to a second embodiment of the present invention, and part (b) of FIG. 8 is a sectional view of the heater according to the second embodiment of the present invention.

Figure 9:
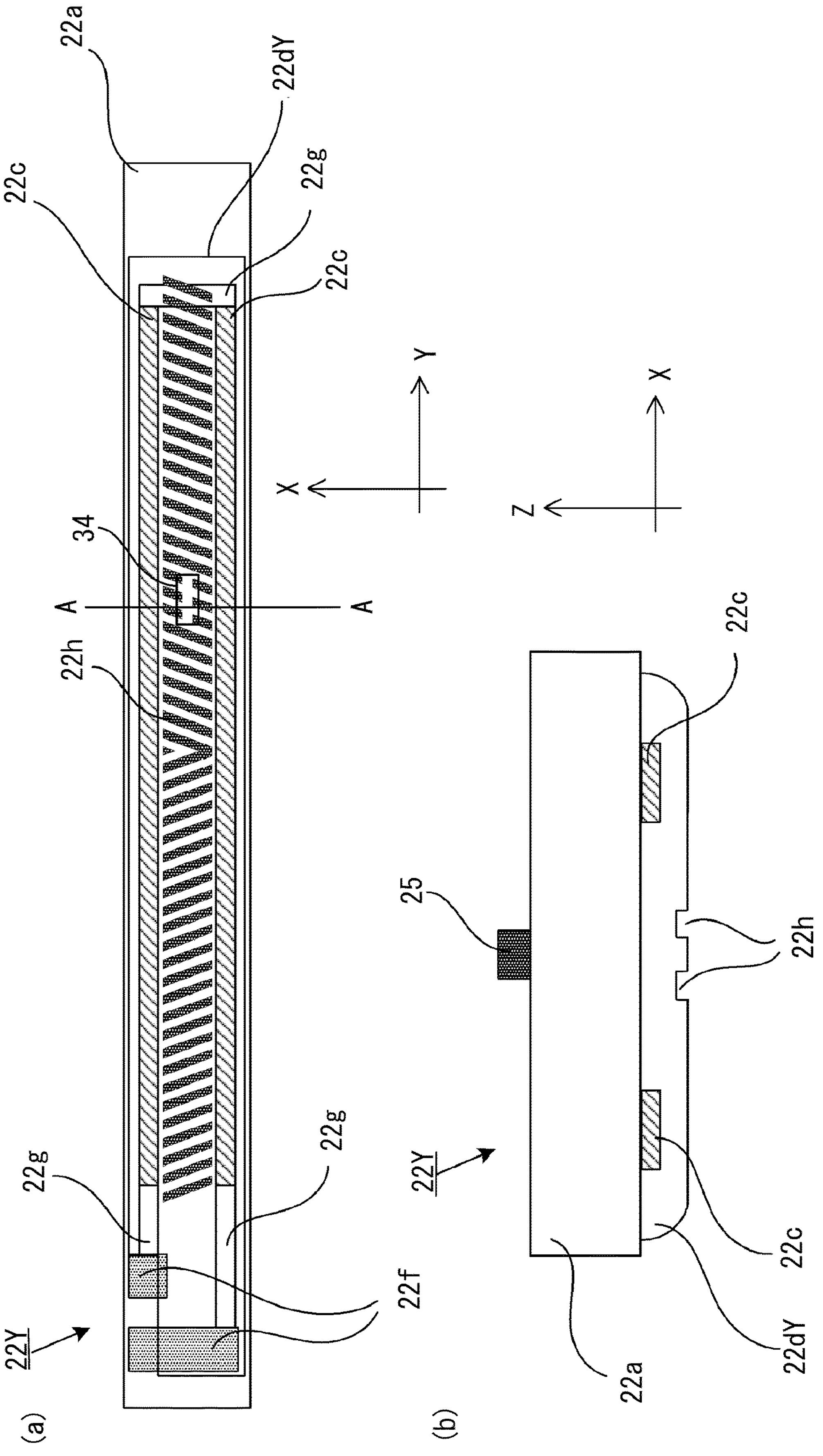

Part (a) of FIG. 9 is a plan view of a heater according to the second embodiment of the present invention, and part (b) of FIG. 9 is a sectional view of the heater according to the second embodiment of the present invention.

DESCRIPTION OF THE EMBODIMENTS

In the following, with reference to figures, embodiments of the present invention will be exemplarily described in detail, based on the embodiments. However, dimensions, materials, shapes, relative arrangements, etc. of component parts which are described in the embodiments may be appropriately changed, according to configurations and various conditions of devices to which the present invention is applied. That is, it is not intended to limit scope of the present invention to the following embodiments. Further, terms which indicates geometrical shapes or relationships, such as parallel, perpendicular, center, straight, circle, etc., are not limited to mathematically exact meanings unless otherwise specified, and are to be interpreted as including ranges which are allowed by manufacturing tolerances, etc.

First Embodiment (1) Image Forming Apparatus

Figure 1:
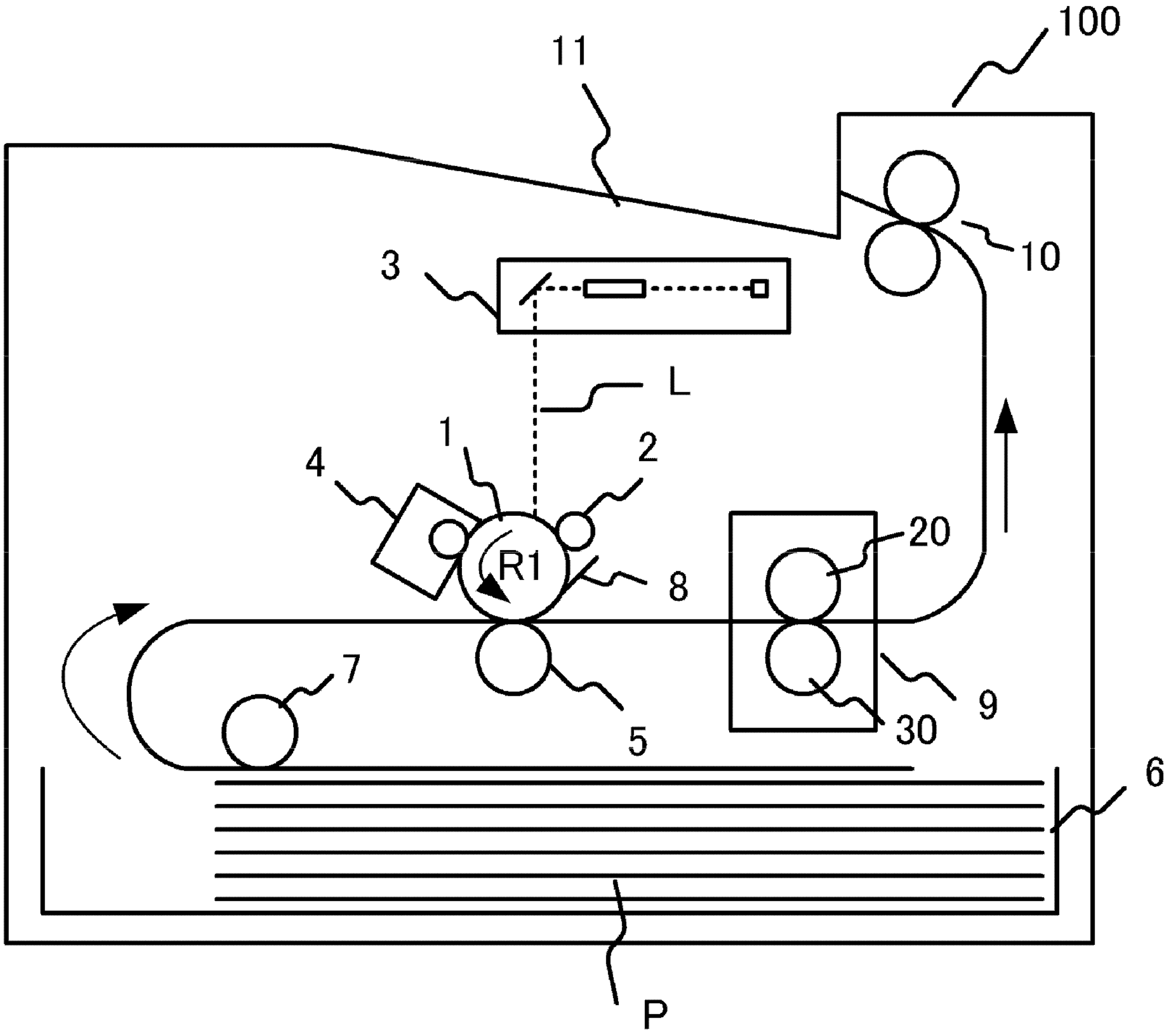
FIG. 1 is a schematic configuration view of an image forming apparatus according to a first embodiment of the present invention.

FIG. 1 is a sectional view of an image forming apparatus 100 which applies electrophotographic record technique. In the following, its operation will be described.

When a print instruction is received, a scanner unit 3 emits laser light L according to image information. A photosensitive member 1, which is an image bearing member which is charged to a predetermined polarity by a charging roller 2 which is a charging means, is scanned by the laser light L which is an exposure means according to the image information. In this way, an electrostatic latent image on a surface of a photosensitive member 1 in accordance with the image information is formed. After that, a developing device 4 which is a developing means supplies toner to the photosensitive member 1, and develops the electrostatic latent image on the photosensitive member 1 into a toner image. The toner image which reaches a transfer position which is formed by the photosensitive member 1 and a transfer roller 5 which is a transfer means by rotation of the photosensitive member 1 in a direction of an arrow R1 is transferred to a recording material P which is fed by a pickup roller 7 from a cassette 6. The surface of the photosensitive member 1 which has passed the transfer position is cleaned by a cleaner 8.

The recording material P on which the toner image has been transferred is heated and pressed in a heating device 9 and the toner image is fixed. After that, the recording material P is discharged by a discharging roller 10 to a discharge tray 11.

The heating device 9 will be described in detail in a next section (2).

(2) Heating Device

In the following, the heating device 9 will be described. The heating device 9 applies a film heating method of a tensionless type. The heating device 9, which applies the film heating method of the tensionless type, uses an endless belt shape (or cylindrical shape) as a heat resistant film. At least part of film circumference is always tension-free (no tension is applied), and the film is rotationally driven by rotational driving force of a pressing member. In the following, the heating device 9 which applies the film heating method will be described in detail.

Figure 2:
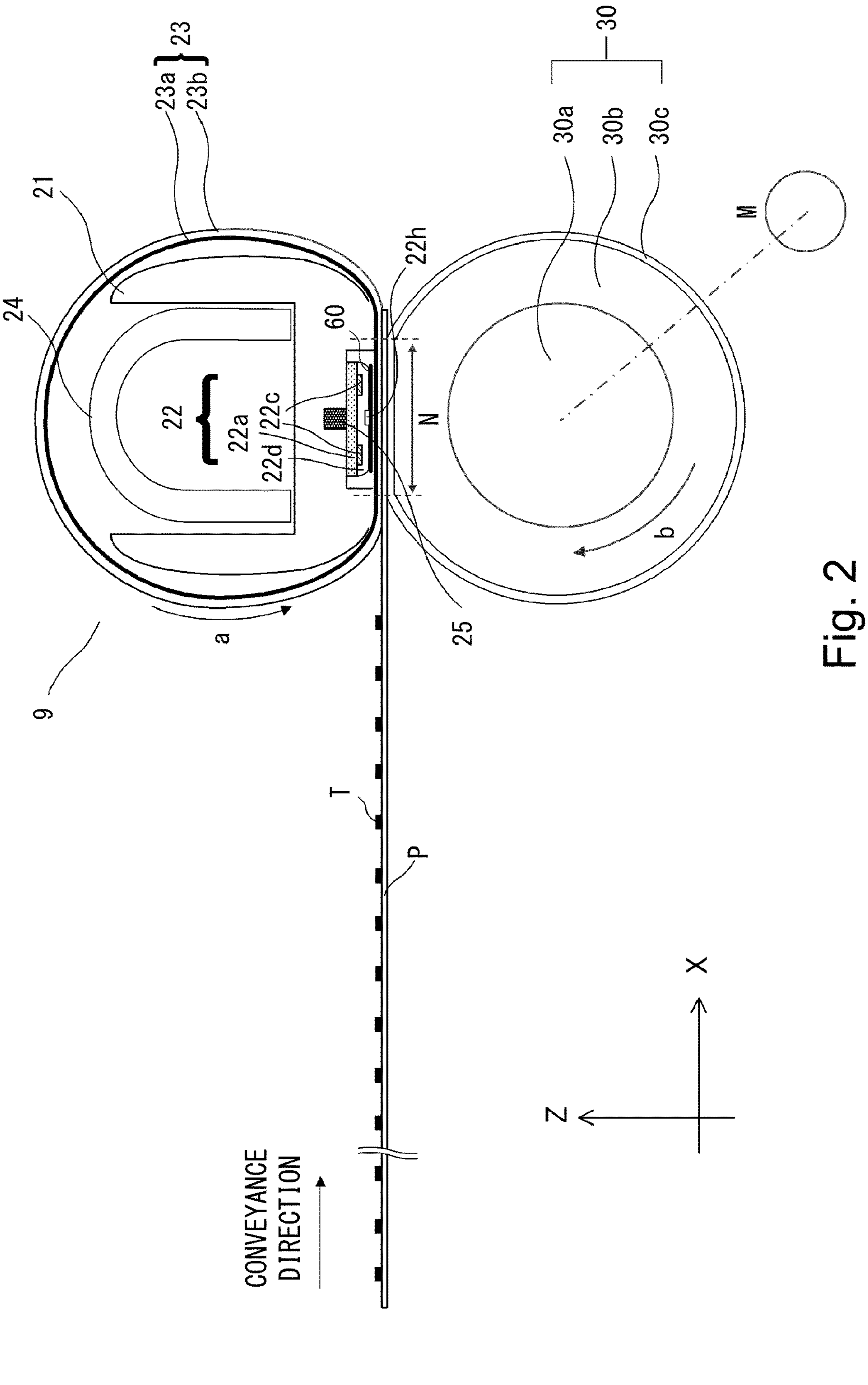
FIG. 2 is a sectional view of a heating device according to the first embodiment of the present invention.
Figure 3:
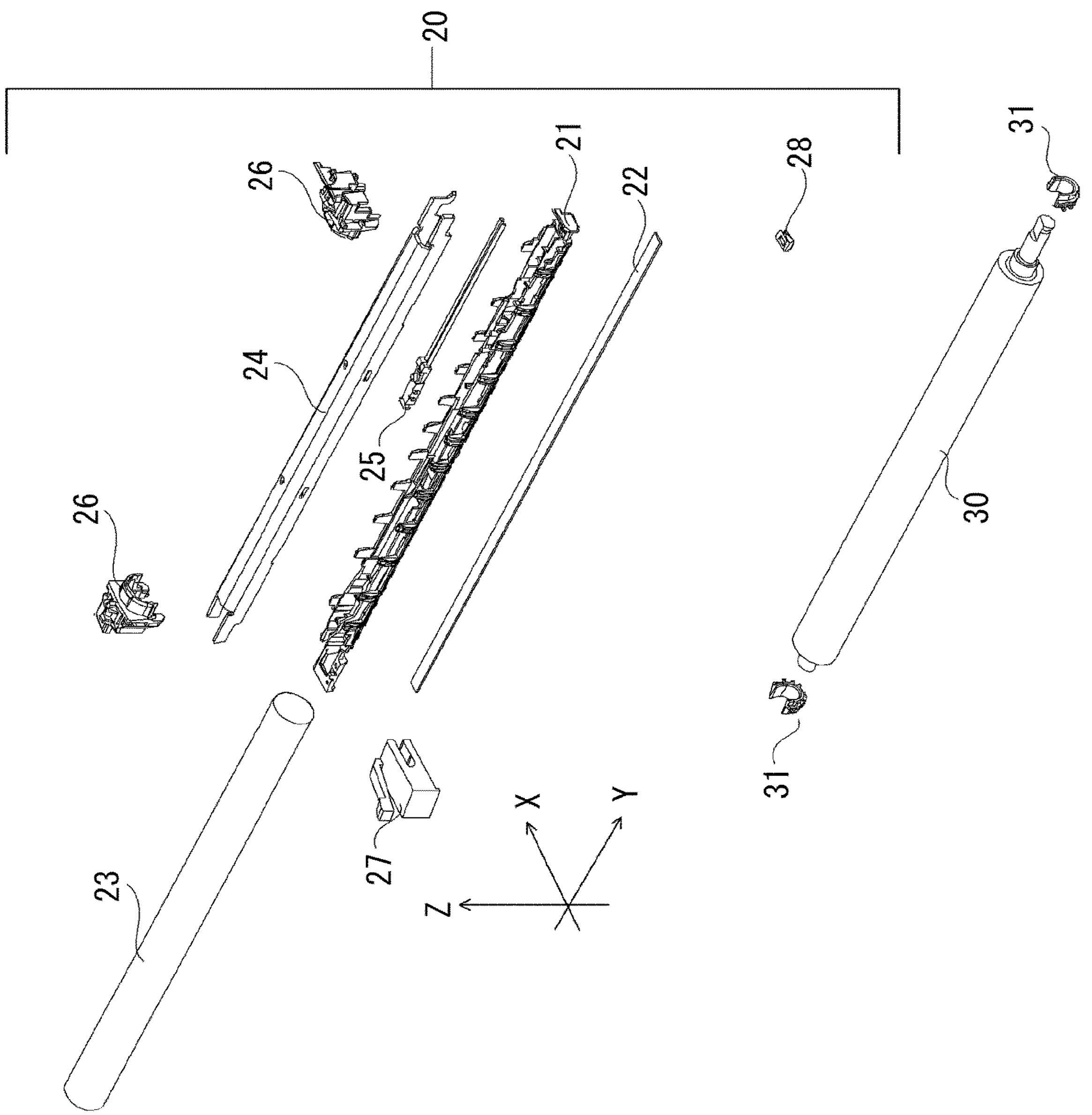
FIG. 3 is an exploded perspective view of a film assembly unit which is used for the heating device according to the first embodiment of the present invention.
Figure 4:
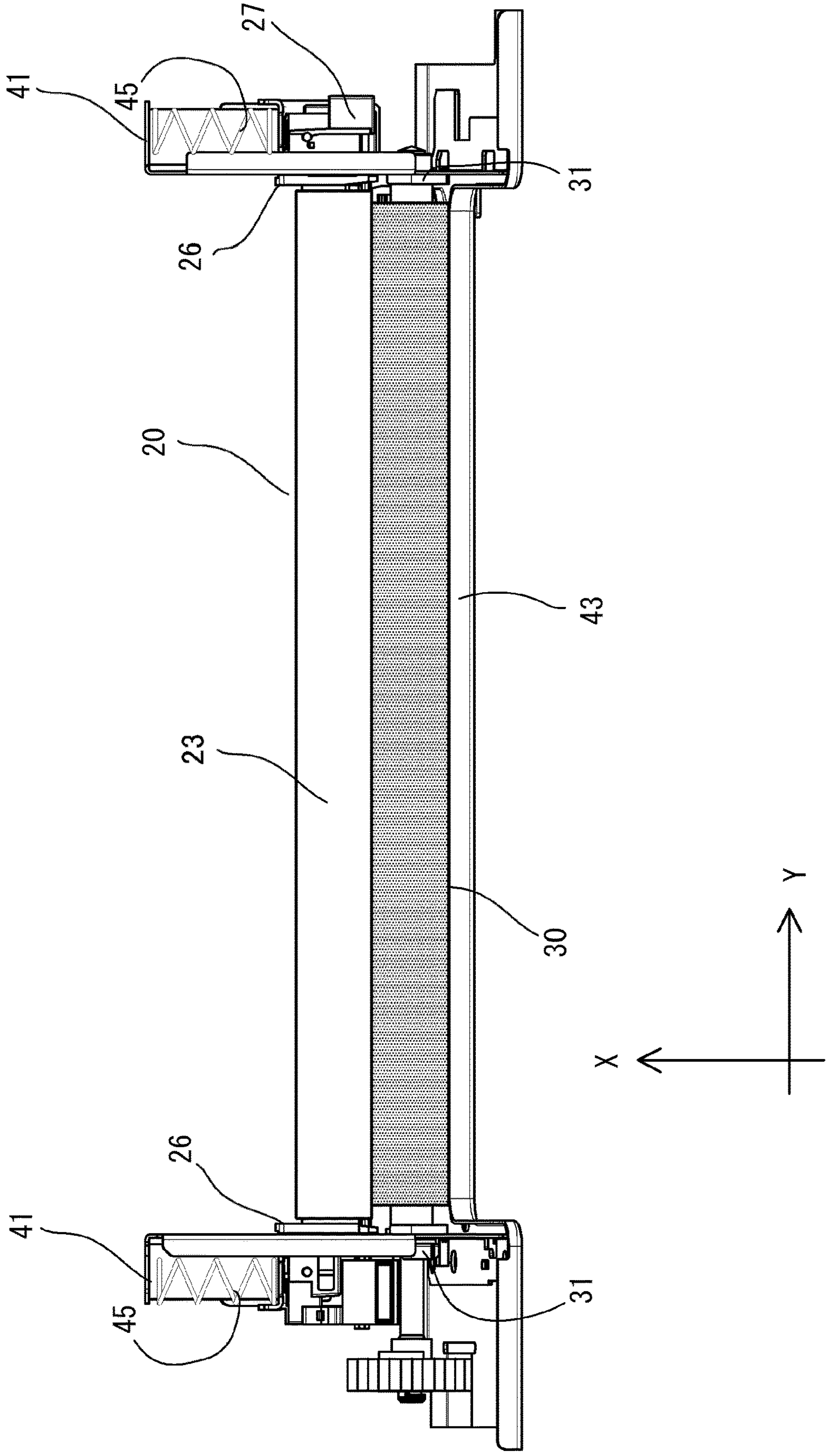
FIG. 4 is a front view of the heating device according to the first embodiment of the present invention.

FIG. 2 is a schematic sectional view of the heating device 9 according to the first embodiment. Further, FIG. 3 is an exploded perspective view of a film assembly unit 20 which is applied to the heating device 9, and FIG. 4 is a front view of the heating device 9.

With reference to the sectional view in FIG. 2, a configuration of the heating device 9 will be described. The heating device 9 according to the first embodiment includes a film 23 which is cylindrical shape and rotatable, a heater 22 which is a heating member which is provided on an inner peripheral side of the film 23, and a pressing roller 30 as a pressing member which forms a nip portion N with the heater 22 via the film 23. Further, grease 60, which is a lubricant in order to improve sliding property with the heater 22, is applied to an inner surface of the film 23.

A reinforcing member 24 is made of metal such as iron and presses the heater 22 via a film guide 21 toward a side of the pressing roller 30. The reinforcing member 24 is a member which has enough strength to prevent significant deformation even when pressure is applied to form the nip portion N by pressing the heater 22 to the side of the pressing roller 30. The film guide 21 has a function as a guide which guides to rotate the film 23. The film guide 21 is a molded product of a heat resistant resin such as PPS (polyphenylene sulfide) or liquid crystal polymer, for example. The pressing roller 30 receives power from a motor M via an unshown power transmission mechanism such as a gear and rotates in a direction of an arrow b. As the pressing roller 30 rotates, the film 23 is driven to rotate in the direction of the arrow a. Rotational directions which are indicated by the arrow a and the arrow b are rotational directions which are same directions as a direction of conveying of the recording material P at the nip portion N.

The heater 22 includes a substrate 22*a* which is made of ceramics. The heater 22 includes the substrate 22*a* which is a long and narrow rectangular plate shape, a heat generating resistor 22*c* which generates heat when it is energized, and a protective layer 22*d* which continuously covers and protects a surface of the heat generating resistor 22*c*. In the following, a longitudinal direction on a rectangular surface on which the heat generating resistor 22*c* is formed on the substrate 22*a* is defined as a Y direction, a short direction which is perpendicular to the longitudinal direction on the surface is defined as an X direction, and a thickness direction which is perpendicular to the longitudinal direction and the short direction is defined as a Z direction. In the first embodiment, a conveying direction of the recording material P at the nip portion N (sliding direction of the heater 22 and the film 23 at the nip portion N) is parallel to the X direction, and directions of rotational axes of the film 23 and the pressing roller 30 are parallel to the Y direction. In the first embodiment, the protective layer 22*d* is configured of a glass coat layer. The protective layer 22*d* is an interposed member which is interposed between the heat generating resistor 22*c* and the inner peripheral surface of the film 23 and is slidable with the inner peripheral surface of the film 23 when the film 23 is rotated. A groove 22*h* is formed as a recess on a surface of the protective layer 22*d*. It is possible to fix an unfixed toner image on the recording material which is nipped and conveyed at the nip portion N on the recording material by heating it with heat which is generated by the heat generating resistor 22*c* which is a heating member via the film 23. The heater 22 will be described in detail in a section (3).

A thermistor 25 which is a temperature detecting portion is abutted with the substrate 22*a* on a side which contacts the film guide 21. The energization of the heat generating resistor 22*c* is controlled according to temperature which is detected by the thermistor 25.

Thickness of the film 23 may preferably be 20 μm or more and 100 μm or less in order to ensure good thermal conductivity. The film 23 may preferably be a single layer film which is made of materials such as PTFE (polytetrafluoroethylene), PFA (tetrafluoroethylene-perfluoroalkyl vinyl ether), PPS, as a base layer 23*a*, or a composite layer film in which a surface of materials such as PI (polyimide), PAI (polyamideimide), PEEK (polyetheretherketone), PES (polyethersulfone), etc., is coated with PTFE, PFA, FEP (tetrafluoroethylene-perfluoroalkyl ether), etc., as a release layer 23*b*. Further, it may also preferable that a pure metal or alloy such as SUS, Al, Ni, Cu, Zn, etc., which have high thermal conductivity, is used for the base layer 23*a*, and the coating treatment which is described above and fluororesin tube coating are applied to the release layer 23*b*.

In the first embodiment, PI with a thickness of 60 μm is used as the base layer 23*a*, and PFA with a thickness of 12 μm is coated as for the release layer 23*b*, considering both wear of the release layer 23*b* due to sheet passing and thermal conductivity. The longitudinal length of the film 23 is 240 mm.

The pressing roller 30 as a pressing member includes a core metal 30*a* which is made of material such as iron or aluminum, an elastic layer 30*b* which is made of material such as silicone rubber, and a release layer 30*c* which is made of material such as PFA. The pressing roller 30 receives power from the motor M via an unshown gear and rotates in the direction of the arrow b. An unfixed toner image T on the recording material P is thermally fixed to the recording material P, when the recording material P is nipped and conveyed at the nip portion N and heated and pressurized. The recorded material P which has passed through the nip portion N is conveyed to the discharge tray 11.

Next, FIG. 3 will be described with reference to the exploded perspective view in FIG. 3. As shown in FIG. 3, after the film guide 21 and the reinforcing member 24 are fitted, the film 23 is externally fitted to an outer peripheral of the film guide 21 and the reinforcing member 24 with a margin in a peripheral length. An axial direction (Y direction) of a cylindrical shape of the film 23 is referred to as a longitudinal direction.

Both end portions of the reinforcing member 24 protrude from both ends of the film 23, a flange member 26 is fitted to each of the ends and, as a whole, they are assembled as a film assembly unit 20.

A power supply terminal of the heater 22 is also protruded from one side end of the film 23 and is engaged with a power supply connector 27. The power supply connector 27 contacts an electrode portion of the heater 22 at a predetermined pressure and forms a power supply passage.

A heater clip 28 is formed from a metal plate which is bent in a U shape and has spring property.

Next, FIG. 4 will be described with reference to the front view in FIG. 4. The flange member 26 restricts a movement of the film 23 which rotates and runs in the longitudinal direction (Y direction) and the heating device 9 restricts a position of the film 23 which is in operation.

The film assembly unit 20 is provided opposing the pressing roller 30, restricted to move in a horizontal direction (Y direction) in the figure, and supported by a casing 41 on a top side of the heating device 9 so that its movement in a vertical direction (X direction) is movable freely. A pressure spring 45 is mounted in the casing 41 on the top side of the heating device 9 in a compressed state. Pressing force of the pressure spring 45 is received by both end portions of the reinforcing member 24 via the flange member 26, the reinforcing member 24 is pressed toward a side of the pressing roller 30, and the entire film assembly unit 20 presses toward the side of the pressing roller 30.

A bearing member 31 is provided to support the core metal 30*a* of the pressing roller 30 on its axis. The bearing member 31 receives the pressing force from the film assembly unit 20 via the pressing roller 30. In order to rotatably support the core metal 30*a* of the pressing roller 30 which becomes relatively high temperature, it is preferable that material of the bearing member 31 is heat resistant and has excellent sliding properties. The bearing member 31 is mounted on a casing 43 on a bottom side of the heating device 9.

(3) Heater 22

Next, materials which configure the heater 22, manufacturing method, etc. according to the first embodiment will be described by using part (a) and part (b) of FIG. 5. Part (a) of FIG. 5 is a plan view of the heater 22, and part (b) of FIG. 5 is a sectional view of the heater 22 along a line A-A which is shown in part (a) of FIG. 5. In part (a) of FIG. 5, a third region 34, in which a region where the thermistor 25 is provided on the substrate 22*a* is projected on a sliding surface, is shown, and in part (b) of FIG. 5, a state that the thermistor 25 contacts the substrate 22*a* is shown.

(3-1) Substrate 22*a*

The substrate 22*a* according to the first embodiment is made of ceramics. A type of ceramics is not specially limited, and it may be selected appropriately considering required mechanical strength, coefficient of linear expansion to match a formation of the heat generating resistor 22*c*, availability of a plate material in a market, etc.

A thickness of the substrate 22*a* may be determined by considering strength, thermal capacity, and heat radiation performance. In a case that the thickness of the substrate 22*a* is thin, it is advantageous for quick start since its heat capacity is small, however, when it is too thin, it is more likely to occur distortion problems during heat forming of the heat generating resistor 22*c*. On the other hand, in a case that the thickness of the substrate 22*a* is thick, it is advantageous in terms of distortion during heat forming of the heat generating resistor 22*c*, however, when it is too thick, it is not advantageous for quick start since the heat capacity is large. The thickness of the substrate 22*a* may preferably be from 0.3 mm to 2.0 mm in a case of taking the balance of mass production, cost, and performance into consideration.

In the first embodiment, an alumina substrate which is 10 mm in width, 300 mm in length, and 1 mm in thickness is used as the substrate 22*a*.

(3-2) Heat Generating Resistor

The heat generating resistor 22*c* is made by printing a heat generating resistor paste which is a mixture of conductive composition, glass composition, and organic binding component, on the substrate 22*a* and then firing (baking) it.

When the heat generating resistor paste is fired, the organic binding component is burned off and the conductive component and the glass component remain, so the heat generating resistor 22*c* which includes the conductive component and the glass component.

Here, silver-palladium (Ag—Pd), ruthenium oxide ($RuO_2$), semiconducting barium titanate ($BaTiO_3$), etc. are used alone or in combination as the conductive component. Further, it is preferable that a sheet resistance of it is from 0.1 [Ω/sq.] to 100 [kΩ/sq.].

Further, other materials other than the conductive component, the glass component, and the organic binding component may be included in the heat generating resistor paste, when they are such a very small quantity that they do not deteriorate its properties of the present invention.

In the first embodiment, silver-palladium (Ag—Pd) is used as the conductive component, and the heat generating resistor paste which is mixed with the glass component and the organic binding component is used, and after coating on the substrate 22*a* by screen printing, the heat generating resistor 22*c* is formed, followed by drying at 180° C. and firing at 850° C. After firing, the thickness of the heat generating resistor 22*c* is set as 15 μm, its length is set as 220 mm, and its width is set as 1.1 mm. A distance between an end portion (longer side) of the substrate 22*a* in the X direction and the heat generating resistor 22*c* is set as 1.0 mm.

(3-3) Power Supplying Electrode 22*f* and Conductive Pattern 22*g*

A power supplying electrode 22*f* and a conductive pattern 22*g* which are shown in part (a) of FIG. 5 are mainly silver (Ag), platinum (Pt), gold (Au), silver-platinum (Ag—Pt) alloy, silver-palladium (Ag—Pd) alloy, etc. Similar to the heat generating resistor paste, after printing the paste which is mixed with the conductive component, the glass component, and the organic binding component on the substrate 22*a*, it is formed by firing.

The power supplying electrode 22*f* and the conductive pattern 22*g* are provided in order to supply power to the heat generating resistor 22*c*, and their resistances are sufficiently low relative to the heat generating resistor 22*c*.

Here, as for the heat generating resistor paste, the power supplying electrode paste, and the conductive pattern paste, which are described above, a material which is soften and melt at a temperature lower than a melting point of the substrate 22*a* is chosen, and a material which is heat resistant in consideration of a practical temperature is chosen.

In the first embodiment, silver is used as the conductive component, and the power supplying electrode paste and the conductive pattern paste in which the glass component and the organic binding component are mixed with it are used. After coating the substrate 22*a* by screen printing, the power supplying electrode 22*f* and the conductive pattern 22*g* are formed followed by drying at 180° C. and firing at 850° C.

(3-4) Protective Layer 22*d*

The protective layer 22*d* which is shown in part (a) and part (b) of FIG. 5 is provided in order to protect the heat generating resistor 22*c* and the conductive pattern 22*g*. It is preferable that a material is glass or PI (polyimide) in terms of heat resistance, and it may be mixed with thermal conductive filler which has insulating properties, etc., as necessary.

In the first embodiment, the protective layer glass paste is used, and after coating the protective layer glass paste on the heat generating resistor 22*c* and the conductive pattern 22*g* by screen printing, the protective layer 22*d* is formed followed by drying at 180° C. and firing at 850° C.

The groove 22*h* which is shown in part (a) of FIG. 5 is a recess which is provided on a sliding surface of the protective layer 22*d* which slides with the inner peripheral surface of the film 23, and is provided at a plurality of locations spaced apart in the Y direction between two of the heat generating resistors 22*c* in the X direction. As shown in part (b) of FIG. 5, the groove 22*h* is formed on the surface layer which is the sliding surface of the protective layer 22*d*.

FIG. 6A is an enlarged view of the heater 22 in a region B of the plan view in part (a) of FIG. 5. The groove 22*h* which is provided on the surface layer of the protective layer 22*d* is formed between two of the heat generating resistors 22*c* in the short direction (X direction) with a gap of 0.2 mm from the heat generating resistor 22*c*. The groove 22*h* is provided at a plurality of locations which are spaced 0.4 mm apart in the longitudinal direction (Y direction). A shape of each of the grooves 22*h* is a line whose width is 0.4 mm in the longitudinal direction (Y direction) and extends in a direction which is inclined at a predetermined angle to the X direction. That is, the groove 22*h* extends in a direction which is inclined to the sliding direction (X direction) between the film 23 and the protective layer 22*d*. The shape of the groove 22*h* is symmetrical between the groove 22*h* on a right side and the groove 22*h* on a left side from a center of the heater 22 with respect to the Y direction in part (a) of FIG. 5. That is, when an inclination of the groove 22*h* which is provided on the right side in part (a) of FIG. 5 from the center of the heater 22 with respect to the Y direction is defined as θ, an inclination of the groove 22*h* on the left side in part (a) of FIG. 5 from the center of the heater 22 with respect to the Y direction is −θ. Incidentally, the inclinations of all of the grooves 22*h* may be same. An interval between adjacent grooves 22*h*, a length of the groove 22*h*, and the inclination of the groove 22*h* with respect to the X direction are defined so that a range of existence of each of the two adjacent grooves 22*h* overlaps in a direction (Y direction) which intersects the sliding direction (X direction). That is, a range on a Y axis in a case that one groove 22*h* is projected on the Y axis overlaps a range on the Y axis in a case that the other groove 22*h* next to the groove 22*h* is projected on the Y axis. The length of the groove 22*h* with respect to the X direction is 5.4 mm.

As shown in FIG. 6A, a gap of 0.2 mm is provided between a first region 71 in which a region where the heat generating resistor 22*c* is provided is projected on the sliding surface of the protective layer 22*d*, and a second region 72 on the sliding surface in which the groove 22*h* is provided. That is, the first region 71 and the second region 72 are not overlapped. Therefore, in a case that it is viewed in a sectional view which is perpendicular to the Y direction as shown in part (b) of FIG. 5, the groove 22*h* does not exist directly under the heat generating resistor 22*c*. Incidentally, in the first embodiment, the region where the heat generating resistor 22*c* is provided is a continuous region which includes the entirety of the heat generating resistor 22*c*. Further, the region where the groove 22*h* is provided is a continuous region which includes the entire plurality of grooves 22*h*. Further, a projection on the sliding surface is a projection in the Z direction.

As shown in part (b) of FIG. 5, since the groove 22*h* is inclined to the X direction, a ratio of a portion L1 in which the groove 22*h* is not provided to a portion L2 of the groove 22*h* in the X direction on the sliding surface of the protective layer 22*d* is almost constant in the Y direction. That is, the ratio of the L1 to the L2 is almost the same regardless of a position of the line A-A with respect to the Y direction in part (a) of FIG. 5. Therefore, it is possible to suppress heat unevenness in the longitudinal direction (Y direction) of the heater 22. On the other hand, when the grooves 22*h* are parallel to the X direction, the ratio of L1 to L2 may occur variation depending on the position in the Y direction, since the groove 22*h* may or may not exist depending on the position of the line A-A with respect to the Y direction.

Further, in the first embodiment, a depth of the groove 22*h* is set to be 5 μm. When the groove 22*h* is too deep, the grease 60 may accumulate in the groove 22*h*, and it may become difficult to supply the grease 60 to a contact surface (sliding surface) of the film 23 and the protective layer 22*d*. In this case, sliding property between the film 23 and the protective layer 22*d* may be reduced. From this viewpoint, it is desirable that the depth of the groove 22*h* may not be limited to 5 μm as in the first embodiment, but the depth of the groove 22*h* may be set appropriately based on a configuration of the heating device 9 and each configuration such as and the type of the grease 60. Further, in the first embodiment, the groove 22*h* which is a linear shape is used as a recess which is provided on the sliding surface of the protective layer 22*d*, however, the recess is not limited to a linear groove, but it may be various shapes such as a dot shape.

(4) Effect

By using the heater 22 which is shown in part (a) and part (b) of FIG. 5, it is possible to reduce a contact area between the film 23 and the protective layer 22*d* in the nip portion N which is shown in FIG. 2. As a result, when the film 23 is driven and rotates by the rotation of the pressing roller 30, it is possible to reduce sliding resistance which is caused by sliding of the inner peripheral surface of the film 23 with the protective layer 22*d* via the grease 60. Therefore, it is possible to obtain satisfactory sliding properties between the film 23 and the protective layer 22*d*. Further, the first region 71 in which the region where the heat generating resistor 22*c* is provided is projected on the sliding surface of the protective layer 22*d*, and the second region 72 on the sliding surface in which the groove 22*h* is provided. Therefore, it is possible to efficiently transfer heat of the heat generating resistor 22*c* to the film 23 via the protective layer 22*d*, and it is possible to thermally fix the toner image T on the recording material P in good condition.

As a result, it is possible to maintain good rotation of the film 23 and good print quality over a long period of time (the number of prints is approximately 150,000 sheets in the case of the first embodiment).

By reducing the sliding resistance between the inner peripheral surface of the film 23 and the protective layer 22*d*, an effect of reducing torque of the motor M which rotationally drives the pressing roller 30. Further, since it is possible to reduce the contact area between the inner peripheral surface of the film 23 and the protective layer 22*d*, an effect of reducing wear on the inner peripheral surface of the film 23 is obtained.

Incidentally, as shown in FIG. 6B, the first region 71 in which the region where the heat generating resistor 22*c* is provided is projected on the sliding surface of the protective layer 22*d* and the second region 72 on the sliding surface in which the groove 22*h* is provided may include an overlap. FIG. 6C is a view showing a section by a line C-C in FIG. 6B. As shown in FIG. 6C, the groove 22*h* is existed directly under a portion of the heat generating resistor 22*c*. In this case, a ratio of an area which is occupied by the groove 22*h* within the first region to an area of the first region 71 may be smaller than a ratio of an area which is occupied by the groove 22*h* within the second region to an area of the second region 72. In a case that the first region 71 and the second region 72 are partially overlapped as shown in FIG. 6B and FIG. 6C, the efficiency of the heat transfer from the heat generating resistor 22*c* to the film 23 is reduced when it is compared to the configuration which is shown in FIG. 6A. On the other hand, it is possible to more reduce the sliding resistance between the film 23 and the protective layer 22*d*, because the area of the second region 72 where the groove 22*h* is formed is larger. It is desirable to adjust the groove 22*h* appropriately in each configuration, such as required heat transfer performance and sliding resistance of the heater 22 and the film 23, a configuration of the heating device 9 and type of the grease 60.

Further, in the first embodiment, a case that the protective layer 22*d* which configures the heater 22 is interposed between the heat generating resistor 22*c* and the inner peripheral surface of the film 23 and is an interposed member which is slidable against the inner peripheral surface of the film 23 when the film 23 is rotated is described. The interposed member of the present invention is not limited to this case, however, it may be configured to include another member such as a heat transfer member between the heater 22 and the film 23, for example, as an interposed member. In this case, the groove 22*h* which is similar to that in the first embodiment is provided on the sliding surface between the interposed member and the film 23. Heat from the heater 22 is indirectly transferred to the film 23 via the interposed member.

Comparative Example 1

A comparative example 1 in order to compare with the first embodiment will be described below. The configurations of the image forming apparatus and the heating device other than a heater 22X in the comparative example 1 is the same as in the first embodiment, so descriptions will be omitted. Part (a) of FIG. 7 is a plan view of the heater 22X according to the comparative example 1, and part (b) of FIG. 7 is a sectional view of the heater 22X at the A-A line which is shown in part (a) of FIG. 7. Unlike the heater 22 according to the first embodiment, a groove is not provided with a protective layer 22*d*X of the heater 22X according to the comparative example 1.

In the heater 22X according to the comparative example 1, the groove is not existed directly under the heat generating resistor 22*c* on the sliding surface of the protective layer 22*d*X similar to the first embodiment. Therefore, it is possible to efficiently transfer heat of the heat generating resistor 22*c* to the film 23 via the protective layer 22*d*, and it is possible to thermally fix the toner image T on the recording material P in good condition. However, since the groove is not provided on the sliding surface of the protective layer 22*d*X, contact area between the film 23 and the protective layer 22*d*X is large and sliding resistance is high, so rotational torque of the film 23 according to the comparative example 1 is higher than that according to the first embodiment.

As a result, rotatability of the film 23 is decreased when the number of prints exceeded approximately 80,000 sheets. When the recording material P is nipped and conveyed in the nip portion N, discrepancy between rotational speed of the film 23 and conveying speed of the recording material P which is conveyed by the pressing roller 30 may occur, and the toner image T on the recording material P may be thermally fixed on the recording material P in a disturbed state.

Second Embodiment

A second embodiment of the present invention will be described below. The configurations of the image forming apparatus and the heating device other than a heater 22Y in the second embodiment is the same as in the first embodiment, so descriptions will be omitted. Part (a) of FIG. 8 is a plan view of the heater 22Y according to the second embodiment, and part (b) of FIG. 8 is a sectional view of the heater 22Y at the A-A line which is shown in part (a) of FIG. 8.

Here, as shown in part (a) of FIG. 5, in the heater 22 according to the first embodiment, the groove 22*h* is existed in the third region 34 in which the region where the thermistor 25 contacts on the substrate 22*a* is projected on the sliding surface of the protective layer 22*d*. Therefore, as shown in part (b) of FIG. 5, the groove 22*h* is existed directly under the thermistor 25 in the Z direction. Since the grease 60 flows into the groove 22*h* during a printing operation, temperature which is detected by the thermistor 25 is affected by an amount of the grease 60 in the groove 22*h*. When variation of the amount of the grease 60 which flows into the groove 22*h* occurs, the temperature which is detected by thermistor 25 is affected by the variation of the amount of grease, and variation of control accuracy of a melting state of the toner image T on the recording material P may occur.

On the other hand, as shown in part (a) of FIG. 8, unlike the heater 22 according to the first embodiment, in the heater 22Y according to the second embodiment, the groove 22*h* is not provided with the third region 34 in which the region where the thermistor 25 contacts on the substrate 22*a* is projected on the sliding surface of the protective layer 22*d*Y. Therefore, as shown in part (b) of FIG. 8, in the heater 22Y according to the second embodiment, the groove 22*h* is not existed directly under the thermistor 25 in the Z direction. Therefore, since the thermistor 25 is possible to detect the temperature stably without being affected by the grease 60, it is possible to thermally fix the toner image T on the recording material P in good condition.

Incidentally, as shown in part (a) of FIG. 9 and part (b) of FIG. 9, the groove 22*h* may be provided in a part of the third region 34 in which the region where the thermistor 25 is provided on the substrate 22*a* is projected on the sliding surface of the protective layer 22*d*. In this case, a ratio of an area which is occupied by the groove 22*h* within the third region to an area of the third region 34 may be smaller than a ratio of an area which is occupied by the groove 22*h* within the second region to an area of the second region 72 in which the groove 22*h* is formed.

Therefore, although the detected temperature of the thermistor 25 is affected somewhat by the grease 60 in the groove 22*h*, it is possible to sufficiently reduce degree of its influence.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025431 filed on Feb. 21, 2023, which is hereby incorporated by reference herein in its entirety.

What is claimed is:

1. A heater comprising:
- a substrate;
- a heat generating member provided on the substrate; and
- a protective layer configured to continuously cover a region in the substrate where the heat generating member is provided and on a surface of which a plurality of recesses are formed,
- wherein when a direction of a longer side in a face of the substrate on which the heat generating member is provided is defined as a longitudinal direction, a direction perpendicular to the longitudinal direction in the face is defined as a short direction, and a direction perpendicular to the longitudinal direction and the short direction is defined as a thickness direction, a first region where the heat generating member is provided and a second region where the plurality of recesses are formed are not overlapped with each other as the protective layer is viewed in the thickness direction, and
- wherein the plurality of recesses
- have a predetermined width, a predetermined length, and a predetermined depth, respectively,
- are arranged at predetermined intervals in the longitudinal direction at positions not overlapped with the heat generating member in the short direction, and
- are formed in an inclined line shape with respect to the short direction,
- wherein one recess of the plurality of recesses and a recess adjacent to the one recess are overlapped with each other in the longitudinal direction,
- wherein the heat generating member includes two heat generating portions spaced apart in the short direction, and
- wherein the plurality of recesses are formed in a region between the two heat generating portions in the short direction.

2. A heater according to claim 1, wherein the substrate is rectangular.

3. A heater according to claim 2, wherein ranges where two adjacent recesses of the plurality of recesses exist, respectively are overlapped with each other.

4. A heater according to claim 1, further comprising a temperature detecting member provided on the substrate,
- wherein the recess is not provided in a third region where the temperature detecting member is provided as the protective layer is viewed in the thickness direction.

5. A heater according to claim 1, further comprising a temperature detecting member provided on the substrate, wherein a ratio of an area occupied by the recess in a third region where the temperature detecting member is provided to an area of the third region is smaller than a ratio of an area occupied by the recess in the second region to an area of the second region as the protective layer is viewed in the thickness direction.

6. A heater according to claim 1, wherein, for each of the plurality of recesses, the predetermined width is 0.4 mm, the predetermined length is 5.4 mm, and the predetermined depth is 5 μm.

7. A heater according to claim 1, wherein the predetermined intervals are 0.4 mm in the longitudinal direction.

* * * * *